US009475645B2

(12) United States Patent
Miller et al.

(10) Patent No.: US 9,475,645 B2
(45) Date of Patent: Oct. 25, 2016

(54) CONVEYOR BELT MODULE WITH SKEWED DRIVE SURFACES

(71) Applicant: Laitram, L.L.C., Harahan, LA (US)

(72) Inventors: Abraham L. Miller, Lacombe, LA (US); Gilbert J. MacLachlan, Harahan, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 14/837,316

(22) Filed: Aug. 27, 2015

(65) Prior Publication Data

US 2016/0060041 A1   Mar. 3, 2016

Related U.S. Application Data

(60) Provisional application No. 62/042,935, filed on Aug. 28, 2014.

(51) Int. Cl.
*B65G 17/06* (2006.01)
*B65G 23/06* (2006.01)
*B65G 17/08* (2006.01)

(52) U.S. Cl.
CPC ............. *B65G 23/06* (2013.01); *B65G 17/086* (2013.01)

(58) Field of Classification Search
CPC ...... B65G 15/02; B65G 23/06; B65G 17/26; B65G 17/40; B65G 17/06; B65G 17/38; B65G 17/086; B65G 17/08
USPC .................................. 198/831, 834, 850–853
See application file for complete search history.

(56) References Cited

U.S. PATENT DOCUMENTS

| | | | |
|---|---|---|---|
| 3,693,780 A | 9/1972 | Fraioli, Sr. | |
| 3,785,476 A | 1/1974 | Poerink | |
| 3,939,964 A | 2/1976 | Poerink | |
| 5,000,312 A | 3/1991 | Damkjaer | |
| 5,174,439 A | 12/1992 | Spangler et al. | |
| 5,217,110 A | 6/1993 | Spangler et al. | |
| 6,415,905 B1 | 7/2002 | Sundermeier et al. | |
| 6,827,204 B2 | 12/2004 | Cribiu' | |
| 7,832,549 B2 * | 11/2010 | Honeycutt | B65G 15/02 198/831 |
| 7,837,028 B2 * | 11/2010 | Elsner | B65G 17/086 198/850 |
| 2005/0183936 A1 | 8/2005 | Neely et al. | |
| 2006/0249359 A1 | 11/2006 | Pasch | |

FOREIGN PATENT DOCUMENTS

| | | |
|---|---|---|
| DE | 3126513 | 1/1986 |
| JP | 62-185617 A | 8/1987 |

OTHER PUBLICATIONS

International Search Report and Written Opinion of the International Searching Authority, PCT/US2015/047123, mailed Nov. 25, 2015, Korean Intellectual Property Office, Republic of Korea.

* cited by examiner

*Primary Examiner* — William R Harp
(74) *Attorney, Agent, or Firm* — Catherine M. Bishop (57) ABSTRACT

A conveyor belt module has a conveying surface and a drive surface having a skewed drive edge for engaging a sprocket tooth. The skewed drive edge is skewed relative to the conveying surface. The skewed drive edge is formed on an interior drive surface in a sprocket pocket and—or an exterior drive surface on a drive element. The skewed drive edge is parallel to a corresponding downwardly-angled drive shaft accommodating sprockets of increasing size for driving a radius conveyor belt formed of a plurality of conveyor belt modules with skewed drive edges.

20 Claims, 13 Drawing Sheets

CONVEYOR BELT MODULE WITH SKEWED DRIVE SURFACES

RELATED APPLICATIONS

The present application claims priority to U.S. Provisional Patent Application No. 62/042,935, filed Aug. 28, 2014 and entitled "Conveyor Belt Module with Skewed Drive Surfaces", the contents of which are herein incorporated by reference.

BACKGROUND OF THE INVENTION

The invention relates generally to power-driven conveyors and more particularly to wedge-shaped modular plastic conveyor belts used to navigate turns.

Modular plastic conveyor belts are widely used in various industries to convey products. Modular plastic conveyor belts are constructed of a series of rows of side-by-side belt modules. Hinge eyes along opposite ends of each row interleave with hinge eyes of consecutive rows. A hinge rod inserted in the interleaved hinge eyes connects the rows together at hinge joints into an endless conveyor belt loop.

Conveyor belts formed of wedge-shaped modules may be used to navigate turns while reducing floor space. Prior wedge-shaped modules require a drive shaft having progressively larger drive sprockets along the shaft to accommodate the widening modules. In order for the conveying surface to remain horizontal and parallel to product flow, the drive shaft must be skewed downwards, causing the hinge rods hinging the modules together to be nonparallel with the driving shaft. Consequently, the teeth of the drive sprockets used to drive the wedge-shaped modules must be angled and shaped, increasing complication and manufacturing costs.

SUMMARY OF THE INVENTION

A conveyor belt module comprises a conveying surface and a drive edge that is skewed relative to the conveying surface. The drive edge is parallel to a drive shaft of a corresponding sprocket assembly, which is angled downwards to accommodate increased sprocket size towards a radially outer end of a conveyor belt formed on a plurality of modules with skewed drive edges.

According to a first aspect of the invention, a conveyor belt module comprises a wedge-shaped deck, first and second sets of hinge elements, a drive element and a drive sprocket. The deck extends longitudinally in a direction of belt travel from a first longitudinal edge to a second longitudinal edge, laterally from a first side edge to a second side edge and in thickness from a top conveying surface to an opposite bottom surface. The second longitudinal edge diverges from the first longitudinal edge. The first set of hinge elements are spaced apart across first gaps along the first longitudinal edge and the second set of hinge elements are spaced apart across second gaps along the second longitudinal edge. The drive element is formed between two of the first set of hinge elements and includes an opening aligned with a hinge opening of the first set of hinge elements. The sprocket pocket is formed below the deck between two of the second set of hinge elements. The sprocket pocket includes an interior drive surface having a first skewed edge that is angled relative to the top conveying surface.

According to another aspect of the invention, a conveyor belt module comprises a wedge-shaped deck, first and second sets of hinge elements, a drive element and a drive sprocket. The deck extends longitudinally in a direction of belt travel from a first longitudinal edge to a second longitudinal edge, laterally from a first side edge to a second side edge and in thickness from a top conveying surface to an opposite bottom surface. The second longitudinal edge diverges from the first longitudinal edge. The first set of hinge elements are spaced apart across first gaps along the first longitudinal edge and the second set of hinge elements are spaced apart across second gaps along the second longitudinal edge. The drive element is formed between two of the first set of hinge elements and includes an opening aligned with a hinge opening of the first set of hinge elements. The sprocket pocket is formed below the deck between two of the second set of hinge elements. The drive element includes an exterior drive surface having a first skewed edge that is angled relative to the top conveying surface.

According to another aspect, a conveyor assembly comprises a sprocket assembly and a conveyor belt. The sprocket assembly comprises a drive shaft angled downwards from horizontal, and a plurality of sprockets mounted on the drive shaft, each sprocket having drive teeth that are perpendicular to the shaft and having outer faces parallel to the drive shaft. The conveyor belt has a top conveying surface and at least one drive surface for contacting the drive teeth. The drive surface includes a drive edge that is parallel to the drive shaft.

BRIEF DESCRIPTION OF THE DRAWINGS

These features and aspects of the invention, as well as its advantages, are better understood by referring to the following description, appended claims, and accompanying drawings, in which:

DETAILED DESCRIPTION OF THE INVENTION

A conveyor belt module employs drive surfaces that are skewed relative to a conveying surface. The invention will be described below relative to certain illustrative embodiments, though those skilled in the art will recognize that the invention is not limited to the described embodiments.

Figure 1:
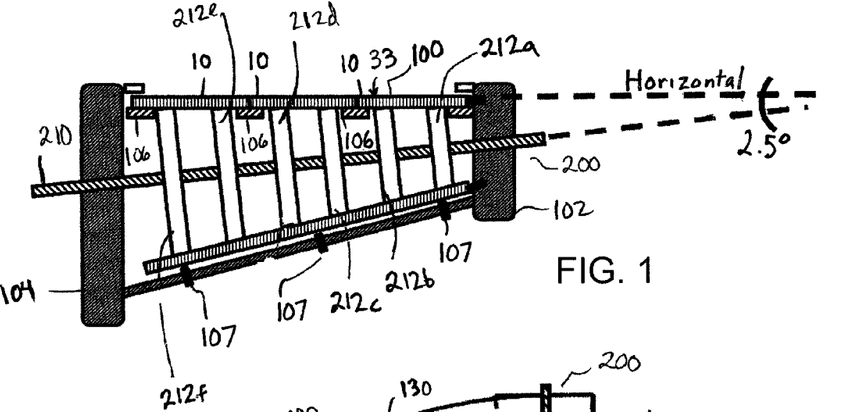
FIG. 1 is a schematic front view of a radius conveyor belt assembly comprising wedge-shaped modules trained around an angled sprocket assembly according to an embodiment of the invention.
Figure 2:
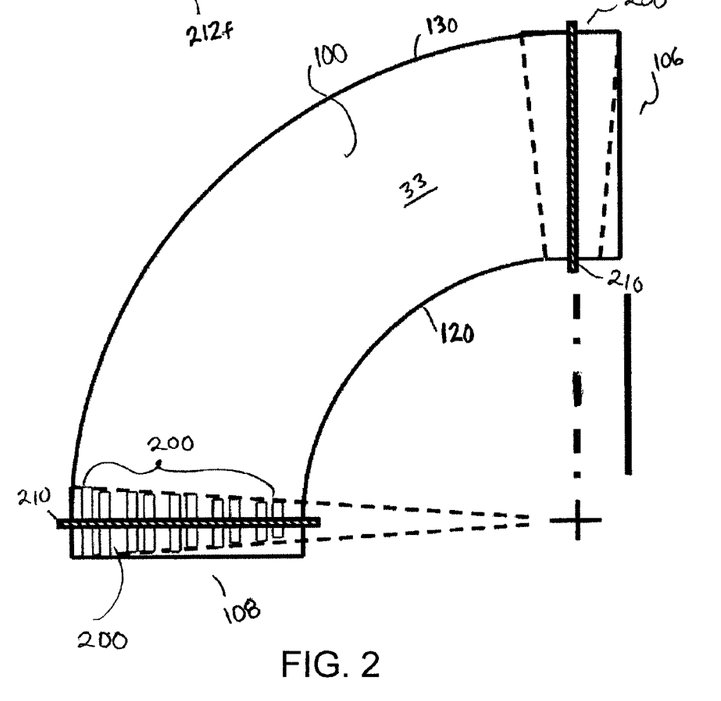
FIG. 2 is a top schematic view of the radius conveyor belt of FIG. 1 navigating a turn.
Figure 3:
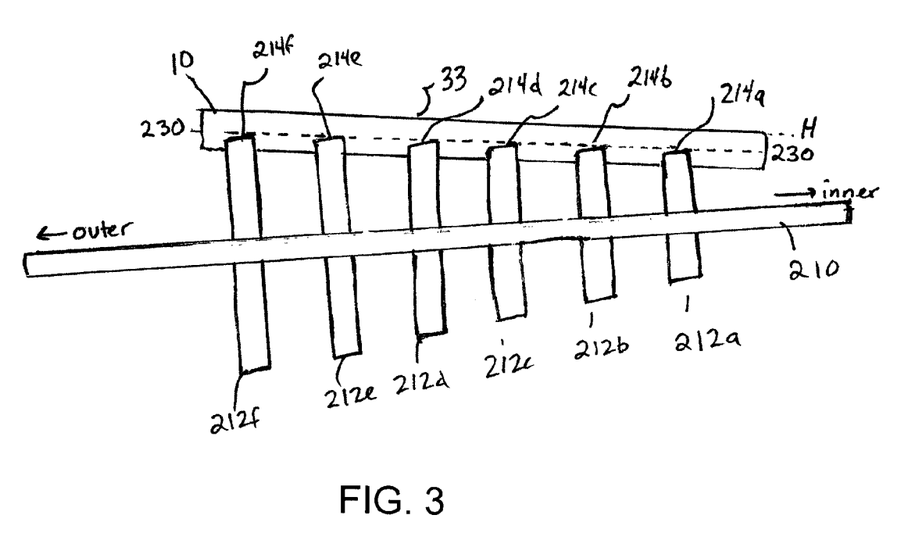
FIG. 3 is a cross-sectional schematic view of an angled sprocket assembly having symmetric and square teeth relative to the radius conveyor belt assembly of FIG. 1.

FIGS. 1 and 2 show an example of a radius conveyor belt 100 used to navigate turns. The upper span, or carryway, of the conveyor belt arcs through about a 90° turn, though the invention is not so limited. The belt is trained around sprockets mounted on each end of the carryway, and returns along a returnway below the carryway. The belt 100 comprises a plurality of hingedly connected, wedge-shaped conveyor belt modules, as shown below, to allow the radially inside edge 120 of the belt to be smaller than the radially outer edge 130 of the belt. The illustrative belt comprises several modules 10 per row, coupled together side-by-side, though the invention may comprise a single module forming a row. An inner frame 102 supports the inside curve of the belt while an outer frame 104 supports the belt near the outside curve. Wear strips 106 form a carryway in the upper span and return framework, shown as rollers 107, support the belt in the returnway. The conveyor belt 100 is trained around sprocket assemblies 200 at the first end 106 and second end 108. Either end 106 or 108 may be the input end with the outer end the output end, and the direction of operation of the belt may be reversible. Each sprocket assembly comprises a series of progressively larger sprockets 212a-f mounted on a drive shaft 210. The largest sprocket 212f is closest to the radially outer edge of the belt 130 to accommodate the larger widths of the modules at the radially outer edge 130 with the smallest sprocket 212a closest to the radially inside edge 120, where the modules are narrower. As shown in FIG. 3, the drive shaft 210 is angled downwards from horizontal towards the radially outer edge of the conveyor, so that the topmost points of the sprockets align along a line 230-230 that is parallel with the belt's conveying surface 33, causing the teeth outer surfaces 214, which may be parallel to the drive shaft axis 210, to be angled downwards and drive faces of the teeth to be angled downwards. As described below, the drive surfaces on the conveyor belt are configured to accommodate the angled, non-horizontal, surfaces of the sprockets 212a-f.

The illustrative drive shaft is angled about 2.5° downwards from the horizontal H, but the invention is not so limited. For example, the drive shaft 210 may be angled anywhere between about 1° and about 10° down from horizontal. As a result, the belt in the returnway is also angled down at an angle about twice the angle of the drive shaft 210, which is 5° in the embodiment shown in FIG. 1.

The drive surfaces of the modules 10 are configured to accommodate the geometry of the sprockets 212, as described below, without requiring shaping or skewing of the sprocket drive teeth. Drive surfaces refer to surfaces of the module configured to contact or otherwise interact with a tooth of a sprocket or other drive element. Unlike prior drive sprockets for radius belts, in which the drive teeth are tapered and have edges that are skewed relative to the drive shaft, the modules of the illustrative embodiments engage sprocket teeth have non-skewed edges and surfaces. Rather, the drive surfaces of the module include skewed edges to allow angling of the sprocket assembly 200.

In the illustrative embodiment, driving sprocket teeth are manufactured parallel to the sprocket bore and shaft 210, and the sprockets 212a-f may be symmetrical, allowing easy manufacture from multiple materials through conventional methods and easy installation. The driven faces of the conveyor belt are angled relative to the rod openings to accommodate the angle of the drive shaft 210.

Figure 4A:
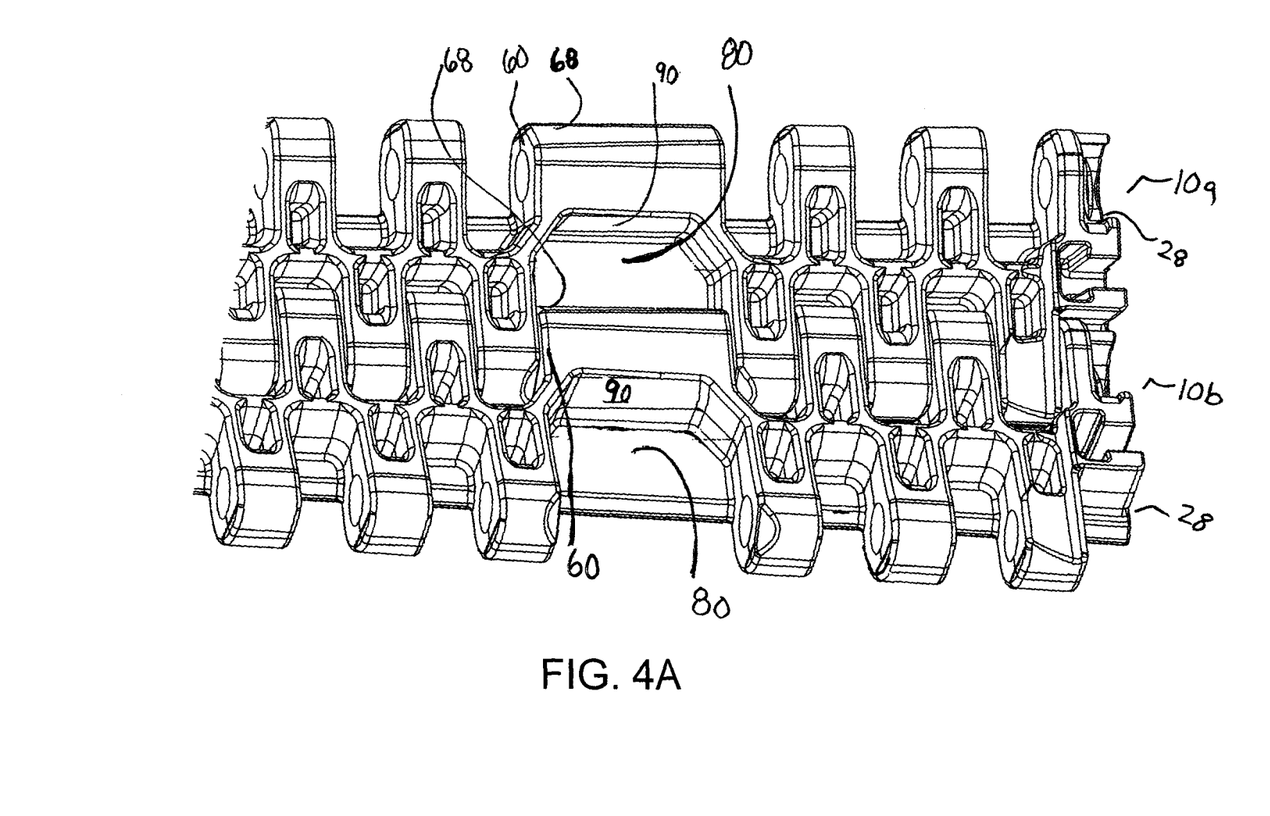
FIG. 4A is a bottom view of a portion of a radius conveyor belt showing two wedge-shaped modules hingedly connected together.
Figure 4B:
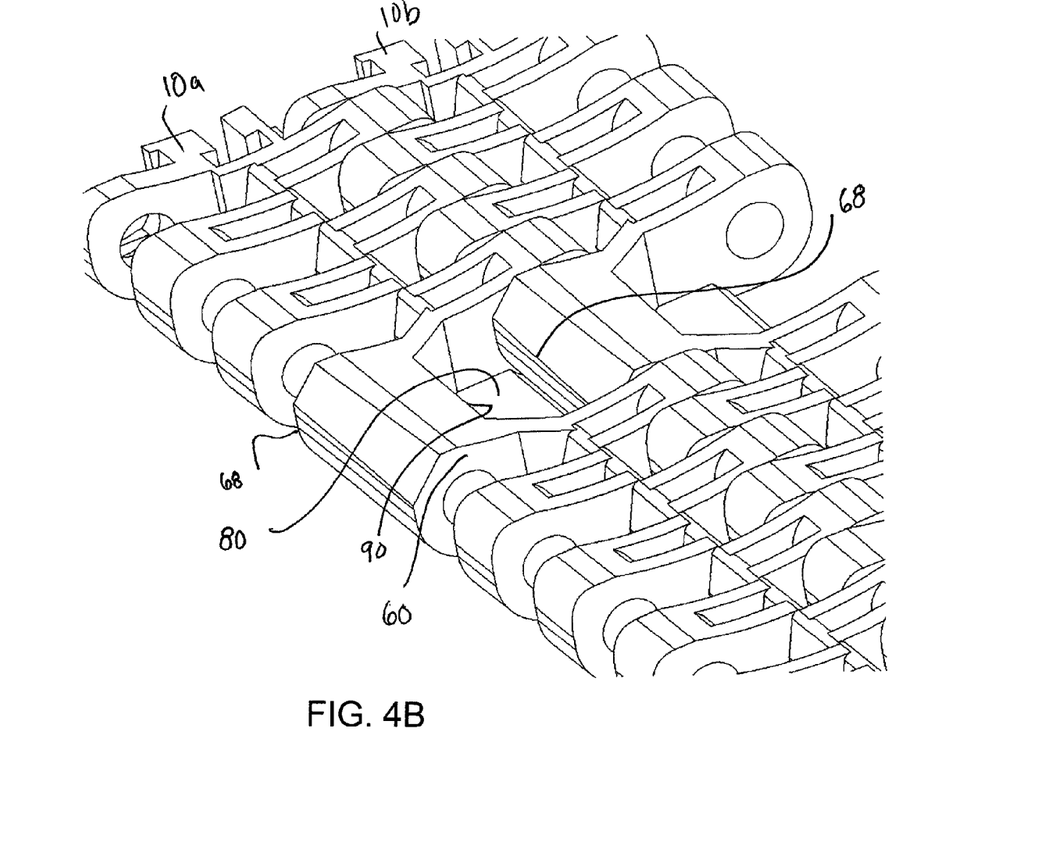
FIG. 4B is another view of the portion of FIG. 4A.

FIGS. 4A and 4B are bottom views of two conveyor belt modules 10a and 10b that could be used to form a conveyor belt 100. The modules 10a and 10b are connected together as they would be to form a conveyor belt 100. The bottom of the conveyor belt includes drive pockets 80 for engaging a drive tooth. In a first mode, the drive surfaces of the module are formed on an interior wall 90 of the pocket 80. In a second, reverse mode, the drive surfaces of the module are formed on an exterior surface 68 formed on a drive element 60, shown as a drive tooth. When two modules are joined, the exterior surface 68 of one module 10b forms a wall of the pocket 80 opposing the interior wall 90 of an adjacent module 10b. The drive surface walls 90 and 68 include skewed edges that are non-parallel with the conveying surface of the modules to allow angling of drive sprockets on a drive shaft.

The illustrative bottom surfaces of the modules are shaped, though the invention is not so limited.

Figure 5:
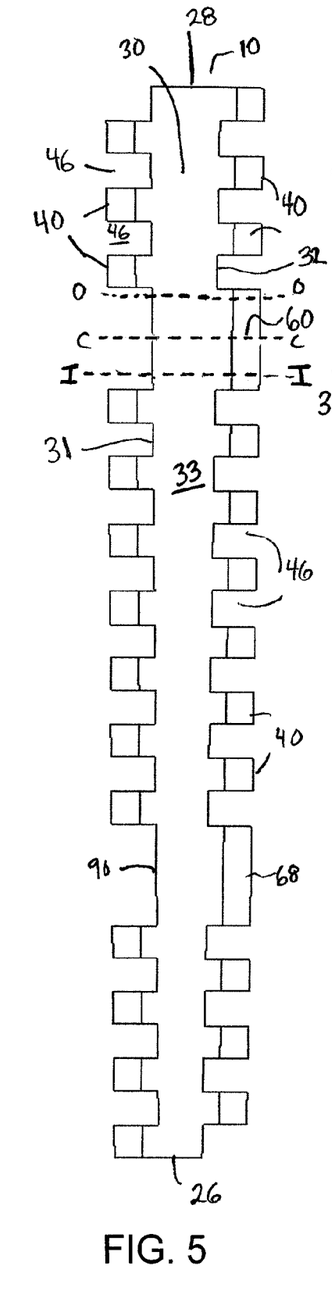
FIG. 5 is a top view of a wedge-shaped conveyor belt module of an embodiment of the invention.
Figure 6:
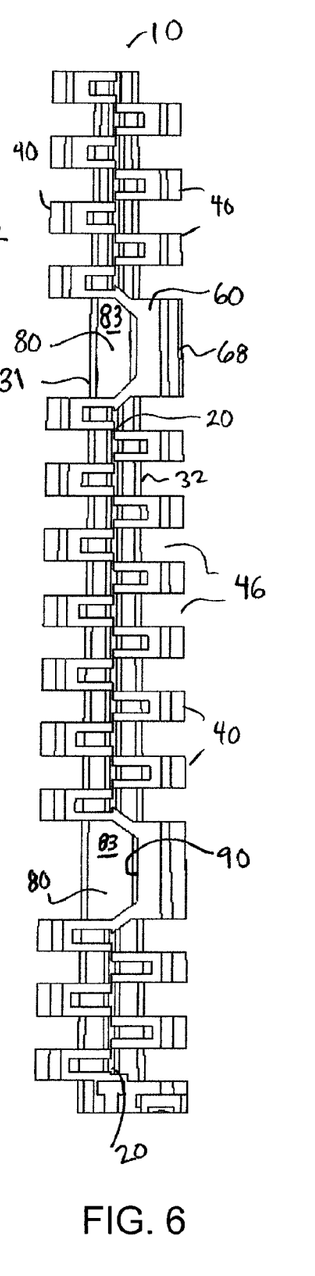
FIG. 6 is a bottom view of the conveyor belt module of FIG. 5.
Figure 7:
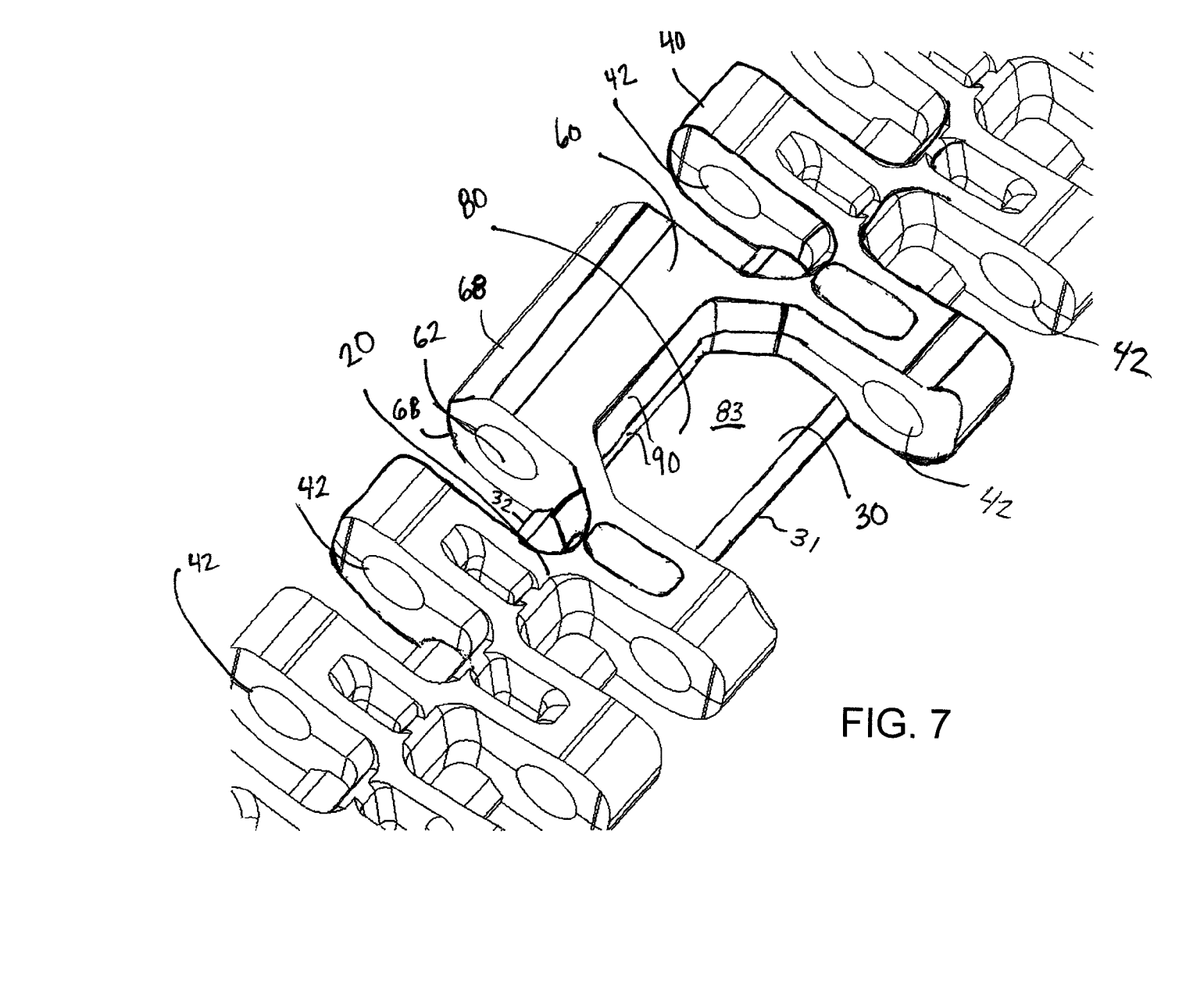
FIG. 7 is an isometric bottom view of the conveyor belt module of FIG. 5.

Referring to FIGS. 5-7, an illustrative conveyor belt module 10 for a radius conveyor belt includes a module body having a central spine 20 and a top decking 30 forming the conveying surface 33 on an upper side. The module body may have any suitable size, shape and configuration and is not limited to the illustrated spine and decking. The decking 30 extends from a radially inner edge 26 to a radially outer edge 28 and is defined by a first longitudinal edge 31, a second longitudinal edge 32 opposite the first longitudinal edge 31, the top conveying surface 33 and an opposing surface 83, which forms the ceiling of the pocket 80. The illustrative decking 30 is wedge shaped, tapering towards the radially inner edge 26. Thus, the longitudinal edges 31, 32 diverge from each other from the radially inner edge 26 to the outer edge 28.

Hinge structure, shown as eyes 40 with aligned openings 42, extends longitudinally outward from each side of the central spine 20 and deck 30. The hinge eyes on one end of the spine are laterally offset from the hinge eyes at the other end. Gaps 46 between laterally consecutive hinge eyes are sized to receive the hinge eyes of similar modules an adjacent row of modules in a conveyor belt. The drive elements 80, 60 are formed between two hinge eyes at selected locations along the length of the spine 20. The drive element 60 extends from edge 32 and comprises an elongated hinge eye having an opening 62 that aligns with the adjacent hinge openings 42. The illustrative drive element 60 is at least twice as long as the hinge eyes 40, though the invention is not so limited. The pocket 80 is formed below the deck 30 opposite the drive element 60 and between to hinge elements 40 extending from edge 31.

The modules are preferably made of thermoplastic polymers, such as polypropylene, polyethylene, acetal, or composite polymers in an injection-molding process. Plastic conveyor belt modules made in this way are available commercially from Intralox, L.L.C., of Harahan, La., USA. In another embodiment, the modules are formed of stainless steel or another suitable material.

A number of modules 10 are used to form a conveyor belt. The belt may comprise a series of rows of edge-to-edge belt modules. The rows are interconnected by hinge rods extending laterally through the passageways 42, 62 formed by the aligned openings in the interleaved hinge eyes between adjacent rows. The belt conveys articles atop the conveying surfaces 33 of the modules along an upper carryway portion of the conveyor.

Figure 8:
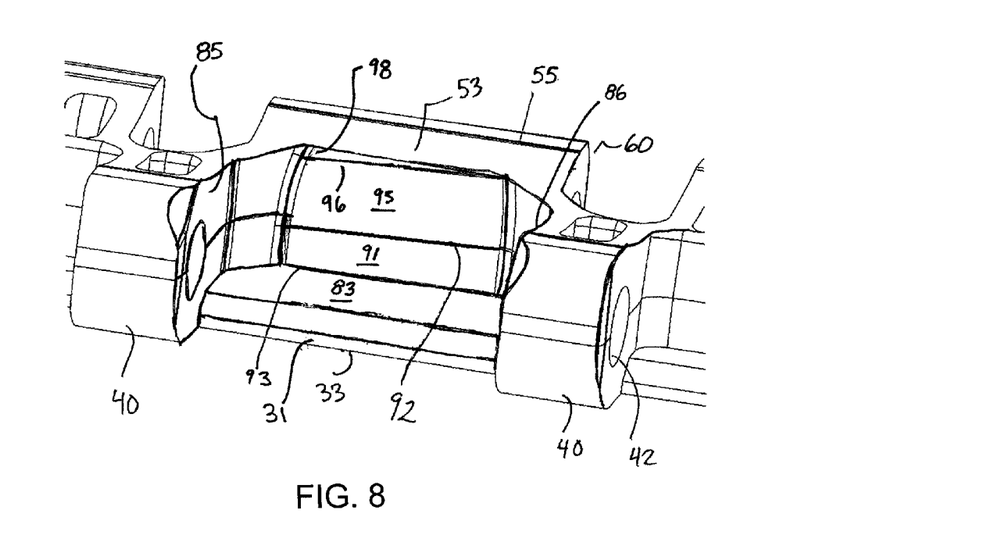
FIG. 8 is an isometric bottom view of the sprocket pocket of the conveyor belt module of FIG. 5.
Figure 9:
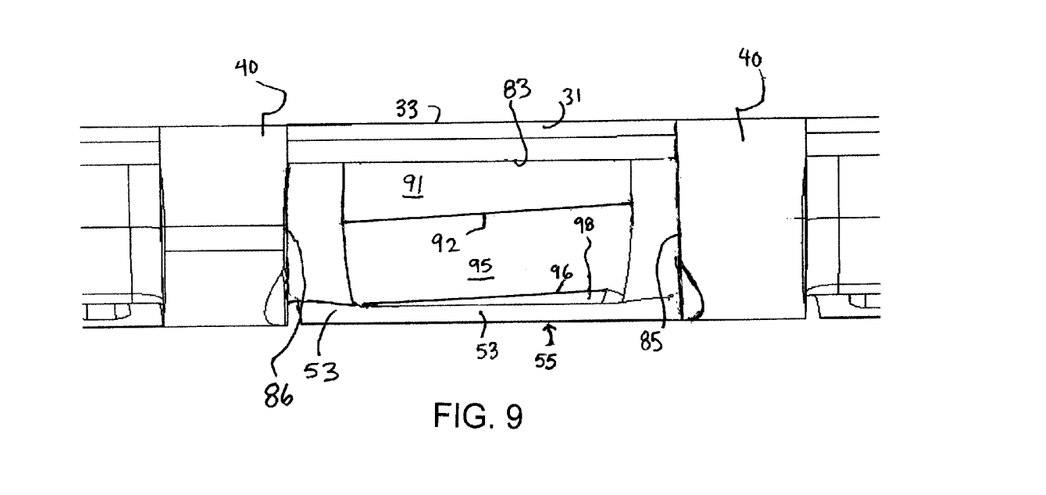
FIG. 9 is a front view of the sprocket pocket of FIG. 8.
Figure 10:
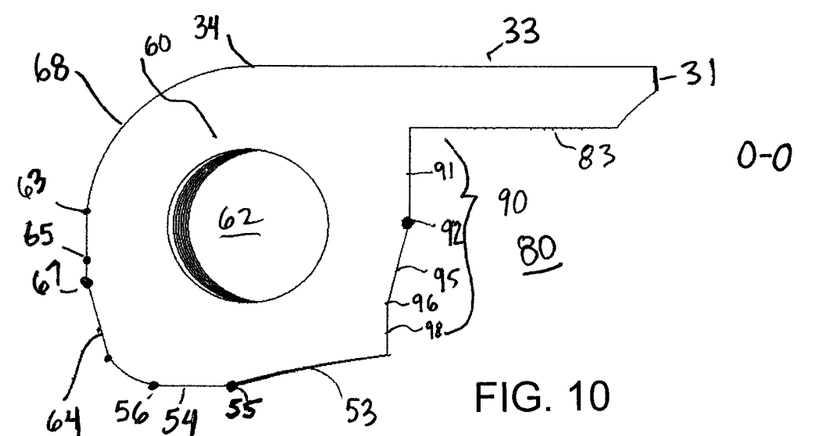
FIG. 10 is a cross-sectional view of the sprocket pocket and drive element through line O-O of FIG. 5.
Figure 11:
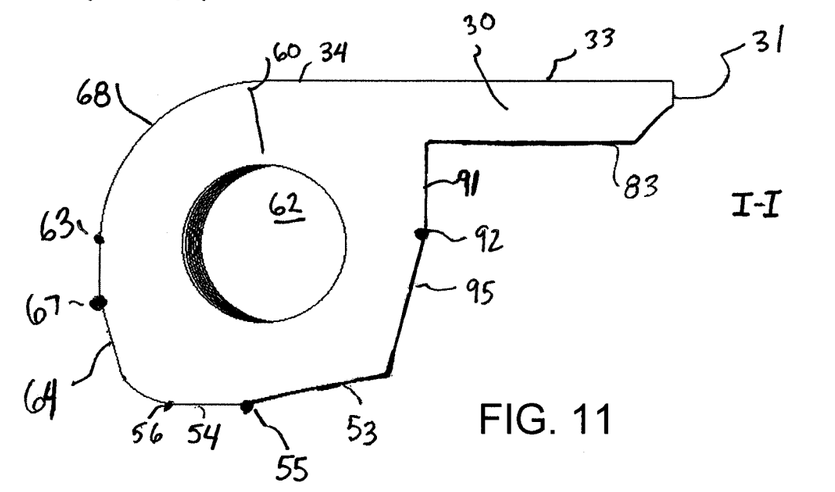
FIG. 11 is a cross-sectional view of the sprocket pocket and drive element through line I-I of FIG. 5.
Figure 12:
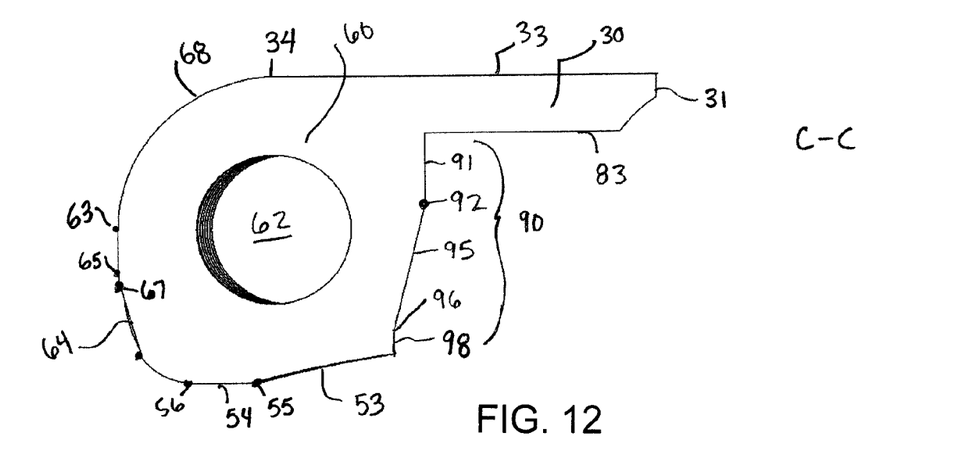
FIG. 12 is a cross-sectional view of the sprocket pocket and drive element through line C-C of FIG. 5.

Referring to FIGS. 8 and 9 the sprocket pocket 80 is defined by a ceiling 83, which is the bottom of the decking 30. The pocket 80 is also defined by sides 85, 86, which form the side walls of the adjacent hinge elements 40. FIGS. 10, 11 and 12 are cross-sectional views through lines O-O, I-I and C-C of FIG. 5. The interior drive face 90 of the pocket 80 forms an inner surface of the drive hinge 60. The drive face 90 has an upper face 91 that intersects the ceiling 83. The illustrative upper face 91 is flat, though alternatively, the upper face may be shaped or contoured. For example, the upper face may be slightly convex to maintain drive surface by reduced wear to increase an area of contact with a drive tooth. The upper face 91 extends substantially perpendicular to the conveying surface 33. The lower edge 92 of the lower flat face 91 is non-parallel with the ceiling 83 and the conveying surface 33. Preferably, the upper edge 92 skews at an angle of about 2.5° relative to the flat conveying surface 33 to match the angle of the drive shaft 210 of a corresponding sprocket assembly. The lower edge may also skew in the lateral or longitudinal direction in addition to the vertical direction.

The interior drive face 90 includes a lower drive face 95. The lower drive face 95 is defined by the skewed edge 92 and a parallel lower edge 96. The lower drive face 95 is angled relative to the upper drive face 91 so that the bottom of the lower drive face 95, defined by lower edge 96 extends towards the drive element 60 and the longitudinal edge 32. The lower drive face 95 may be flat or shaped.

A shaped triangular or wedge-shaped connecting surface 98 extends between lower drive face 95 and a bottom surface 53 of the drive element 60. The triangular connecting surface tapers from the radially inner edge to the radially outer edge of the module and angles towards the drive element bottom surface 53 to allow clearance space for the sprocket teeth. Bottom surface 53 extends to ridge edge 55.

The skewed edge 92 allows corresponding sprocket teeth to contact the sprocket pocket in the module squarely, even as the sprocket teeth angle away from the conveying surface 33.

FIG. 10 is a cross-sectional view of the sprocket pocket 80 and drive element 60 through line O-O of FIG. 5, which is towards the outside edge of the sprocket pocket. FIG. 11 is a cross-sectional view of the sprocket pocket 80 and drive element 60 through line I-I of FIG. 5, which is towards the radially inner edge of the sprocket pocket. FIG. 12 is a cross-sectional view of the sprocket pocket 80 and drive element 60 through line C-C of FIG. 5, which is in the center of the sprocket pocket. As shown, the edge 92 approaches the ceiling 83 and conveying surface closer to the inner edge and angles away from the ceiling 83 and conveying surface 33 closer to the outer edge of the module. Transition surface 98 tapers from the radially outer part of the pocket shown in FIG. 10, and is absent in the radially inner part of the pocket, shown in FIG. 12.

Figure 13:
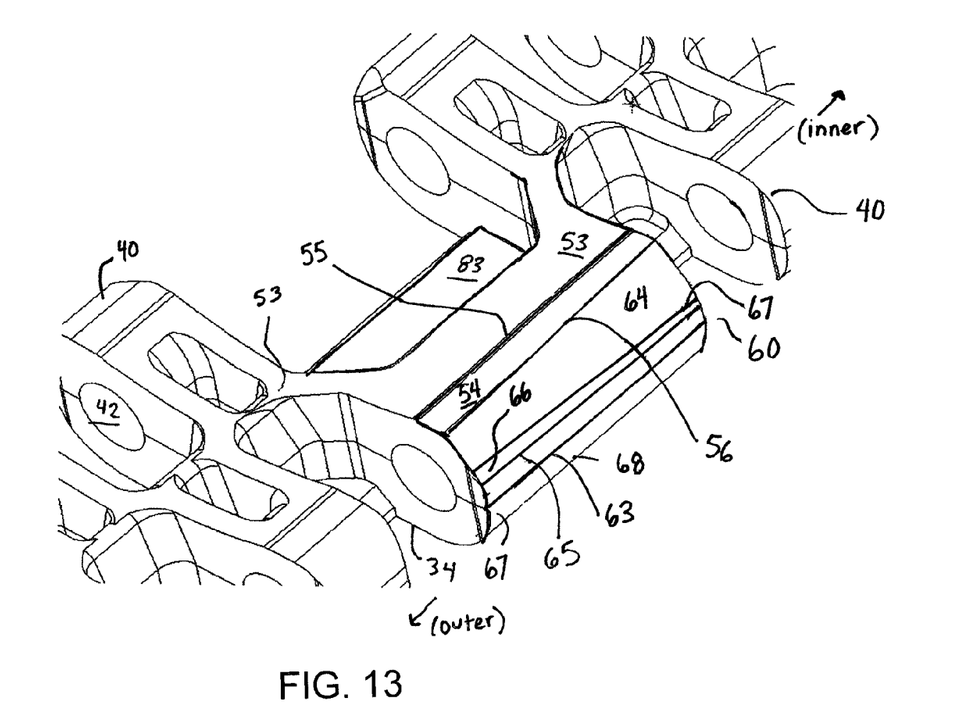
FIG. 13 is an isometric view of a portion of the conveyor belt module of FIG. 5, showing the exterior drive surface of a drive element.
Figure 14:
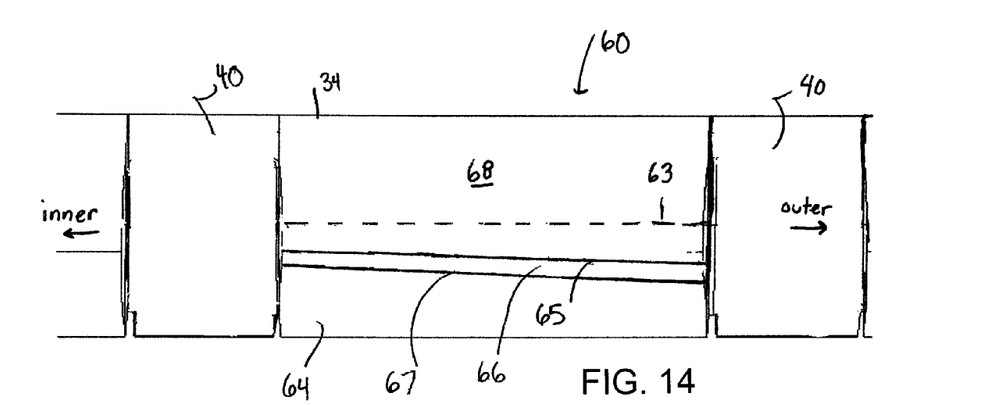
FIG. 14 is a front view of the exterior drive surface of FIG. 13.
Figure 15:
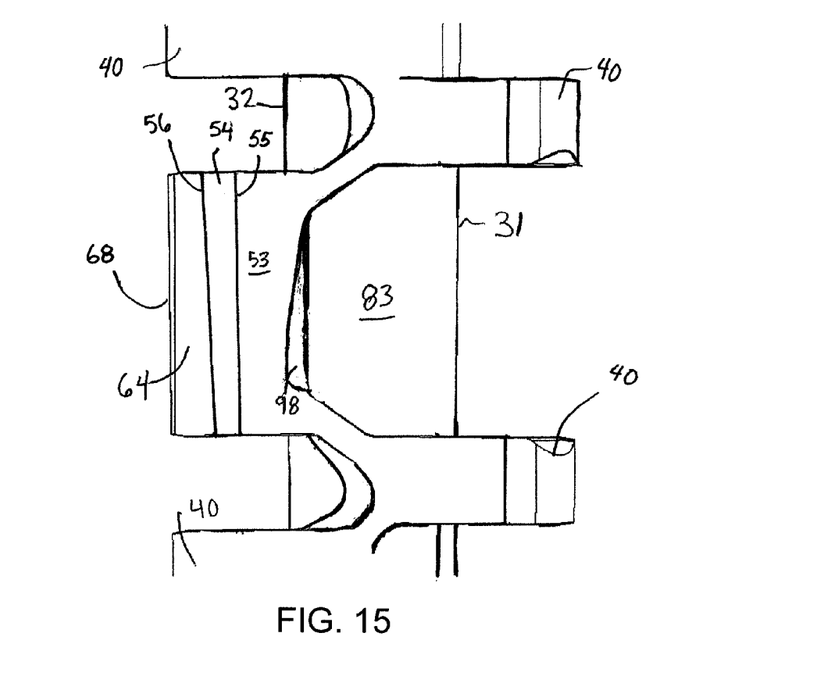
FIG. 15 is a bottom view of a drive element and sprocket pocket of the conveyor belt module of FIG. 5.

Referring also to FIGS. 13, 14 and 15, the drive element 60 includes an exterior drive face 68 that is also shaped to accommodate an angled sprocket assembly. A top surface 34 of the drive element 60 aligns with the top conveying surface 33 and top surfaces of the hinge eyes 40. The exterior drive surface 68 curves down from the top surface 34. Below a mold parting line 63, the exterior drive surface forms a skewed edge 65. The edge 65 moves away from the horizontal top conveying surface 33 as the edge moves towards the radially outer edge of the module. Preferably, the edge 65 skews downwards at the same angle that the drive sprocket angles downwards, or about 2.5° in the illustrative embodiment. A surface 66 is formed between the skewed edge 65 and another skewed edge 67. The surface 66 may be slightly wedge-shaped, with the skewed edges 65, 67 diverging, or the skewed edges 65, 67 may be parallel. Surface 66 may be flat or contoured. Skewed edge 67 forms the driving edge for the module in the illustrative embodiment, though the invention is not so limited. The surface 66 may be omitted, with skewed edges 65 and 67 converged into a single edge.

Below the skewed edge 67, the exterior face of the drive element 60 forms a flat surface 64, which is wedge-shaped. The flat surface 64 narrows towards the radially outer edge of the module. Skewed edge 56 forms the opposing side of the flat surface 64. The flat surface 64 is slightly offset from corresponding surfaces on the hinge elements 40. Another wedge-shaped surface 54, which may be flat or contoured, is formed on the bottom surface of the drive element 60 between skewed edge 56 and inner edge 55, which is parallel to longitudinal edge 32.

A bottom surface 53, which may be flat or contoured, extends between edge 55 and the pocket wall 90.

The skewing of the drive surfaces of the module allow symmetrical sprockets with conventionally-oriented teeth to drive the modules with no additional manufacturing costs, reduced conveyor complexity and continued maintenance of the sprocket pocket orientation.

FIGS. 16-19 are cross-sectional views of a conventional sprocket 212 with tooth outer faces 214 perpendicular to the drive shaft driving a conveyor belt 100 having modules 10 including skewed drive surfaces according to an embodiment of the invention. The driven faces of the sprocket pocket 80 and drive element 60 are aligned with the driving faces 217 or 218 of the teeth 216, even though the upper conveying surfaces 33 of the modules are skewed relative (non-perpendicular) to the sprockets.

Figure 16:
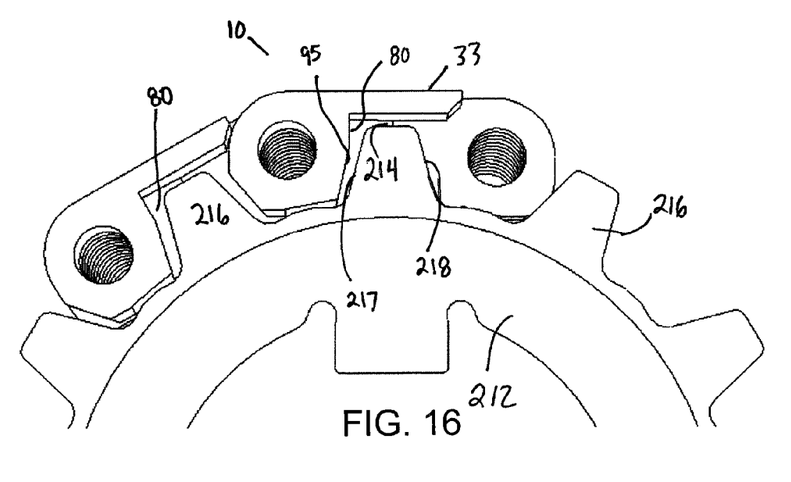
FIG. 16 is a cross-sectional view of a sprocket engaging a conveyor belt comprising modules through a center plane of the sprocket according to one embodiment.
Figure 17:
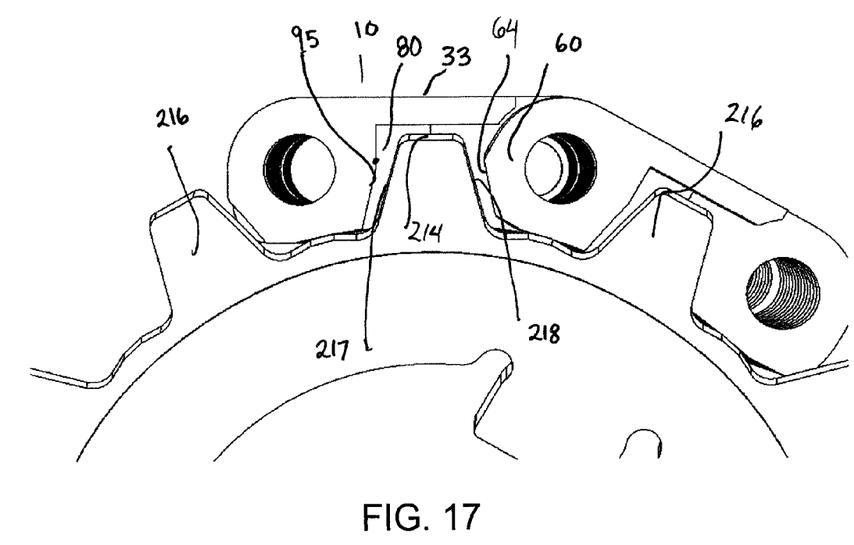
FIG. 17 is a cross-sectional view of the sprocket and belt of FIG. 16 at a wide side of the sprocket pocket.
Figure 18:
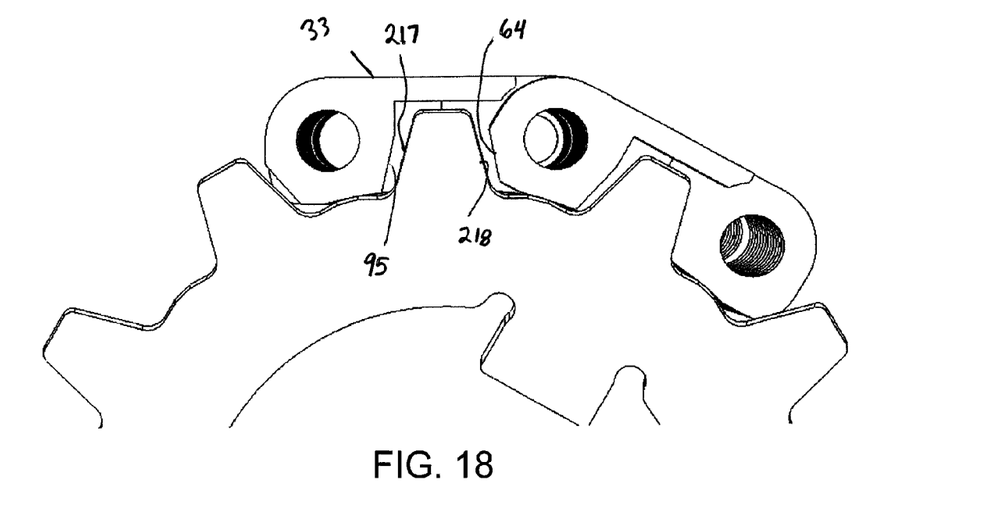
FIG. 18 is a cross-sectional view of the sprocket and belt of FIG. 16 at the lateral center of the sprocket pocket.
Figure 19:
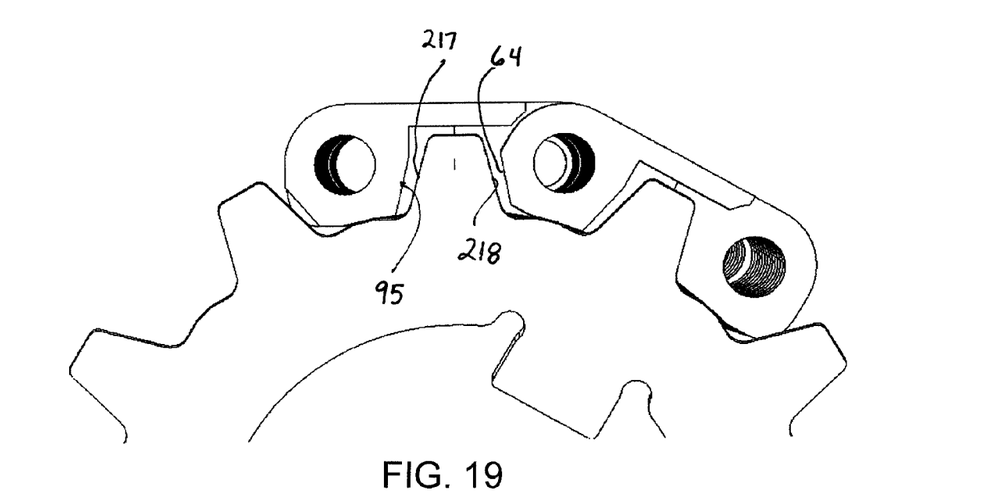
FIG. 19 is a cross-sectional view of the sprocket and belt at a narrow side of the sprocket pocket.

FIG. 16 is a cross-sectional view of a sprocket 212 engaging a conveyor belt 100 comprising modules 10 through a center plane of the sprocket 212. FIG. 17 is a cross-sectional view of the sprocket 212 and belt 100 at a wide side of the pocket (towards the radially outer edge). FIG. 18 is a cross-sectional view of the sprocket 212 and belt 100 at the lateral center of the pocket. FIG. 19 is a cross-sectional view of the sprocket 212 and belt at a narrow side of the pocket (towards the radially inner edge). As shown, the sprocket teeth 216 squarely contact the sprocket pocket 80 at drive face 217. The drive face 95 of the sprocket pocket 80, formed by skewed edges (as described above), is parallel to the drive face 217 of the tooth, and drive face 218 of the tooth, opposite drive face 217, is parallel to flat surface 64, formed by skewed edges.

The angle of the tooth faces 217 and 218 preferably match the angles on the pocket drive face 95 and drive element face 64.

The configuration of the drive surfaces on the module to have skewed edges provides manufacturing and installation benefits over the prior approach of angling the sprocket teeth to accommodate the angled sprocket assembly. For example, sprocket machining is facilitated, sprockets are more easily oriented on the shaft, because they are symmetrical, and may be more easily inspected.

Although the invention has been described in detail with reference to a few exemplary versions, other versions are possible. The scope of the claims is not meant to be limited to the versions described in detail.

What is claimed is:

1. A conveyor belt module comprising:
a wedge-shaped deck extending longitudinally in a direction of belt travel from a first longitudinal edge to a second longitudinal edge, wherein the second longitudinal edge diverges from the first longitudinal edge, laterally from a first side edge to a second side edge and in thickness from a top conveying surface to an opposite bottom surface;
a first set of hinge elements spaced apart across first gaps along the first longitudinal edge;
a second set of hinge elements spaced apart across second gaps along the second longitudinal edge;
a drive element formed between two of the first set of hinge elements, the drive element having an opening aligned with a hinge opening of the first set of hinge elements;
a sprocket pocket formed below the deck between two of the second set of hinge elements;
wherein the sprocket pocket includes an interior drive surface having a first skewed edge that is angled relative to the top conveying surface.

2. The conveyor belt module of claim 1, wherein the first skewed edge is angled between about 1° and about 10° relative to the top conveying surface.

3. The conveyor belt module of claim 2, herein the first skewed edge is angled about 2.5° relative to the top conveying surface.

4. The conveyor belt module of claim 1, wherein the first skewed edge is closer to the conveying surface at a radially inner portion of the sprocket pocket than at a radially outer portion of the sprocket pocket.

5. The conveyor belt module of claim 1, wherein the drive element includes an exterior drive surface having a skewed edge that is angled relative to the top conveying surface.

6. The conveyor belt module of claim 1, wherein the interior drive surface further includes a second skewed edge.

7. The conveyor belt module of claim 6, wherein the first and second skewed edges are parallel.

8. The conveyor belt module of claim 1, wherein the sprocket pocket is formed opposite the drive element.

9. A conveyor belt module comprising:
a wedge-shaped deck extending longitudinally in a direction of belt travel from a first longitudinal edge to a second longitudinal edge, wherein the second longitudinal edge diverges from the first longitudinal edge, laterally from a first side edge to a second side edge and in thickness from a top conveying surface to an opposite bottom surface;
a first set of hinge elements spaced apart across first gaps along the first longitudinal edge;
a second set of hinge elements spaced apart across second gaps along the second longitudinal edge;
a drive element formed between two of the first of hinge elements, the drive element having an opening aligned with a hinge opening of the first set hinge elements;
a sprocket pocket formed below the deck between two of the second set of hinge elements;
wherein the drive element includes an exterior drive surface having a first skewed edge that is angled relative to the top conveying surface.

10. The conveyor belt module of claim 9, wherein the sprocket pocket is formed opposite the drive element.

11. The conveyor belt module of claim 9, wherein the first skewed edge is angled between about 1° and about 10° relative to the top conveying surface.

12. The conveyor belt module of claim 11, wherein the first skewed edge is angled about 2.5° relative to the top conveying surface.

13. The conveyor belt module of claim 9, wherein the first skewed edge is closer to the top conveying surface at a radially inner portion of the drive element than at a radially outer portion of the drive element.

14. The conveyor belt module of claim 9, wherein the exterior drive surface is wedge-shaped.

15. The conveyor belt module of claim 9, wherein the exterior drive s comprises a plurality of wedge-shaped flat surfaces.

16. A conveyor assembly, comprising:
a sprocket assembly comprising a drive shaft angled downwards from horizontal, and a plurality of progressively larger sprockets mounted on the drive shaft, each sprocket having drive teeth that are perpendicular to the shaft and outer faces parallel to the drive shaft; and
a conveyor belt having a horizontal top conveying surface in an upper carryway portion and at least one drive surface below the horizontal top conveying surface for contacting the drive teeth, the drive surface including a drive edge that is parallel to the drive shaft.

17. The conveyor assembly of claim 16, wherein the drive surface is wedge-shaped.

18. The conveyor assembly of claim 16, wherein the drive surface is formed on an exterior portion of a drive element.

19. The conveyor assembly of claim 16, wherein the drive surface is formed in an interior surface of a sprocket pocket.

20. The conveyor assembly of claim 16, wherein the drive shaft and drive edge are angled downwards between about 1° and about 10° relative to horizontal.

* * * * *